United States Patent [19]

Vargiu et al.

[11] 3,867,346

[45] Feb. 18, 1975

[54] PROCESS FOR THE PRODUCTION OF LIQUID EPOXY-NOVOLAK RESINS AND PRODUCT THEREOF

[75] Inventors: Silvio Vargiu; Mario Pitzalis, both of Milan; Giancarlo Crespolini, Bergamo, all of Italy

[73] Assignee: Societa Italiana Resine S.I.R. S.p.A., Milan, Italy

[22] Filed: Sept. 7, 1973

[21] Appl. No.: 395,092

[30] Foreign Application Priority Data

Sept. 20, 1972  Italy .................................. 29426/72

[52] U.S. Cl. ... 260/59 EP, 117/161 L, 117/161 ZB, 260/32.8 EP, 260/33.6 EP, 260/47 EP
[51] Int. Cl. ............................................... C08g 5/18
[58] Field of Search ..................... 260/59 EP, 47 EP

[56] References Cited
UNITED STATES PATENTS

| | | | |
|---|---|---|---|
| 3,396,145 | 8/1968 | Gruenwald............................ | 260/47 |
| 3,492,269 | 1/1970 | Jassen et al........................... | 260/47 |
| 3,632,836 | 1/1972 | Walker................................ | 260/830 |

Primary Examiner—Lester L. Lee
Attorney, Agent, or Firm—Sughrue, Rothwell, Mion, Zinn & Macpeak

[57] ABSTRACT

Process for the production of liquid epoxy-novolak resins having high contents of epoxy groups by (a) mixing and homogenizing a novolak phenolic resin having a molecular weight of about 220 to 300 and with about 2.2 to 2.9 phenolic hydroxyl groups per molecule and an epihalohydrin (about 5 to 10 moles of epihalohydrin are used per mole equivalent of phenolic hydroxyl groups in the novolak phenolic resin), (b) contacting the homogenized mixture with kieselguhr at temperatures of about 20° to 40° C and separating the kieselguhr, (c) adding an inorganic base in the course of at least 1 hour at temperatures of about 80° to 115° C (the total quantity of base to be used being so chosen that the ratio of the number of phenolic hydroxyl groups in the novolak resin to the number of equivalents of base is about 0.78:1 to 0.75:1) and (d) separating the liquid epoxy-novolak resin from the reaction mixture obtained.

14 Claims, No Drawings

PROCESS FOR THE PRODUCTION OF LIQUID EPOXY-NOVOLAK RESINS AND PRODUCT THEREOF

The invention relates to a process for the production of liquid eposy-novolak resins having improved properties. In particular, the invention relates to a process for the production of liquid epoxy-novolak resins having high contents of epoxy groups, that are suitable for the production of coating compositions, adhesives, casting resins, laminates, and moulding compositions.

It is known that novolak phenolic resins can be allowed to react with compounds that introduce epoxy groups, e.g. epihalohydrins, such as epichlorohydrin or 3-chloro-1,2-epoxybutane, in the presence of a hydrogen halide acceptor, e.g. an inorganic base. Epoxynovolak resins, i.e., epoxy resins of higher functionality, are obtained as the products; cf. Methoden der Organischen Chemie (Houben-Wey), 4th Edition, Vol. XIV/2 (1963), pages 472–473. These epoxy resins can be converted into macromolecular products with curing agents. Compounds that can react with epoxy groups, such as amines, anhydrides of dicarboxylic acids, or polyamides, may be used as curing agents; cf. Methoden der Organischen Chemie (Houben-Weyl), 4th Edition, Vol. XIV/2 (1963), pages 499 to 532.

In comparison with conventional bisphenol-epoxy resins, the epoxy-novolak resins have a higher content of epoxy groups (expressed as the number of epoxy groups per 1 mole of resin). Conventional epoxy resins, which are mostly prepared from 2,2-bis-(4-hydroxyphenyl)propane and epichlorohydrin, contain not more than 2 epoxy groups per molecule. On curing, epoxynovolak resins with higher contents of epoxy groups give products having higher cross-link densities and improved stability to chemicals and to heat. However, epoxy-novolak resins with higher contents of epoxy groups have the disadvantage of excessively high viscosities in comparison with conventional liquid epoxy resins. Moreover, according to known processes it is difficult to achieve complete or substantially complete etherification of novolak resin and conversion into epoxy containing groups.

One object of the invention is therefore to provide an improved process for the production of liquid epoxynovolak resins that are characterized by high contents of epoxy groups, low contents of phenolic hydroxyl groups and low viscosities, the vicosity being of the same order as that of conventional liquid bisphenolepoxy resins.

It has been found in accordance with the invention that liquid epoxy-novolak resins having very low viscosities are obtained by subjecting a mixture comprising the novalak phenolic resin and an agent that introduces epoxy groups to a special purification process before the reaction.

The invention thus relates to a process for the production of liquid epoxy-novolak resins by reaction of novolak phenolic resins with an epihalohydrin in the presence of an inorganic base, characterized in that a. a novolak phenolic resin having an average molecular weight of about 220 to 300 and containing about 2.2 to 2.9 phenolic hydroxyl groups per molecule and an epihalohydrin are mixed and homogenized, about 5 to 10 moles of epihalohydrin being used per mole equivalent of phenolic hydroxyl groups in the novolak phenolic resin, b. the homogenized mixture is brought into contact with kieselguhr at temperatures of about 20° to 40° C, and subsequently the kieselguhr is seperated, c. an inorganic base is added to the mixture obtained in accordance with (b) in the course of at least 1 hour at temperatures of about 80° to 115° C, the total quantity of base to be used being so chosen that the ratio of the number of phenolic hydroxyl groups in the novolak resin to the number of equivalents of base is about 0.68:1 to 0.75:1, and d. the liquid epoxy-novolak resin is separated from the mixture obtained in accordance with (c).

The contact time in (b) is preferably 1 to 60 minutes. No advantage arises from contact times exceeding 60 minutes.

It has been found that in this process practically all the phenolic hydroxyl groups in the novolak resin are converted into epoxy groups, with the result that liquid epoxy-novolak resins having unusually low viscosities are formed.

In the process of the invention, novolak phenolic resins prepared by condensation of phenol with formaldehyde and having softening points of about 25° to 35°C, average molecular weights of about 220 to 300, and about 2.2 to 2.9 phenolic hydroxyl groups per molecule are used. These novolak resins are obtained by condensation of phenol with formaldehyde in a molar ratio of about 1.6:1 to 1.9:1 at temperatures of about 80° to 110° C in the presence of an inorganic or organic acid, such a hydrochloric acid, phosphoric acid, formic acid, oxalic acid, acetic acid, or salicylic acid, as a catalyst.

Any conventional halohydrin may be used as the epihalohydrin. Epichlorohydrin is particularly preferred. The addition of about 6 to 8 moles of epichlorohydrin per 1 mole equivalent of phenolic hydroxyl groups in the novolak phenolic resin is preferred.

An alkali metal or alkaline earth metal hydroxide, oxide, or carbonate may be used as the inorganic base. Sodium hydroxide is preferably used. Kieselguhr denotes products obtained from diatomaceous earth by crushing, drying, and screening and possibly by calcining. White kieselguhr preparations that have been subjected to a special calcination treatment to reduce their specific surface area and to convert certain impurities into insoluble products are particularly suitable for the process of the invention. For example, the products marketed under the trade names Celite, manufactured by the Johns-Manville Products Corporation; Dicalite, manufactured by the Great Lakes Carbon Corporation; and Randall, available through Winkelmann Mineraria S.p.A. as a distributor in Milan, Italy; may be used.

In the process of the invention, the novolak phenolic resin is first melted, and the compound for the introduction of epoxy groups, preferably epichlorohydrin, is then added. The quantity of epichlorohydrin used is within the range indicated above. To achieve satisfactory homogenization of the mixture, the operation is preferably carried out at elevated temperatures, particularly at about 40° to 70° C. The homogenized mixture is then cooled to about 20° to 40° C and treated at these temperatures with kieselguhr. For this purpose, about 1,000 parts by weight of the mixture of novolak resin and epihalohydrin are mixed with about 2 to 4 parts by weight of kieselguhr. In this case a contact time of about 15 minutes is especially preferred. The composition is then stirred and filtered. In a preferred embodiment of the process of the invention, the mixture of novolak resin and epichlorohydrin is filtered through a filter that contains a layer of kieselguhr. A contact time of about 1.5 minutes is preferred. In this case the best results are obtained with kieselguhr having a particle size of about 20 to 100 $\mu$. An inorganic base, preferably sodium hydroxide, is then added to the reaction mixture treated in this way, with the result that the introduction of epoxy groups is initiated. The inorganic base is added gradually to the mixture in the course of at least 1 hour, generally 3 to 4 hours. The inorganic base is preferably used in the form of an aqueous solution. The concentration of the inorganic base in the aqueous solution is not particularly critical. Good results are obtained with an approximately 50 wt. percent aqueous sodium hydroxide solution. This step is carried out at temperatures of about 80° to 115° C. The reaction mixture is heated to boiling point, and water is distilled out of the reaction mixture together with the epihalohydrin, with which it forms an azeotropically boiling mixture. When the addition of the inorganic base to the reaction mixture is complete, the above-mentioned reaction conditions are maintained for about 20 to 50 minutes. At the same time, the unreacted epihalohydrin is distilled off under reduced pressure, preferably at about 20 to 40 mm Hg. The reaction product is finally cooled. The resulting epoxy-novolak resin is preferably dissolved in an organic solvent. Particularly preferred solvents for this purpose are methyl isobutyl ketone, toluene, benzene, and tetrahydronaphthalene. The resulting solution of the epoxy-novolak resin is then washed with water to remove the inorganic halide salts, which are by-products of the process. Elevated temperatures, particularly 60° to 90° C, are preferably used for this operation to improve the separation of the salt. The organic phase is separated, dried, filtered, and evaporated to dryness under reduced pressure with a temperature of at most 150° to 170° C in the reaction vessel to remove the solvent.

By proceeding under the above described conditions liquid epoxy novolak resins are obtained typically exhibiting the following properties:

| Colour (Gardner number) | 1 to 3 |
| Viscosity at 25°C | 13,000 to 20,000 cps |
| Epoxy equivalent weight | 170 to 190 |
| Gelling time | 20 to 40 minutes |

The gelling time is determined as follows. 10 parts by weight of triethylenetetramine are added to 90 parts by weight of resin in a metal vessel having a capacity of 250 ml. This mixture is placed in a thermostat at 25 ± 1°C. The time between the addition of the amine and the start of gel formation is taken as the gelling time.

The invention is illustrated by the following non limiting examples.

EXAMPLE 1

A flask fitted with a stirrer, a reflux condenser, a thermometer, and an inlet tube for an inert gas is charged with 440 parts by weight of a novolak phenolic resin having the following properties:

| average molecular weight | 264 |
| softening point | 25 to 28°C |
| viscosity at 25°C in 50% ethanol | 14 cps |
| average number of hydroxyl groups per molecule | 2.6 |

The novolak phenolic resin is obtained in a known manner by condensation of phenol and formaldehyde in a molar ratio of 1.7:1 in the presence of oxalic acid as a catalyst. The novolak phenolic resin is mixed within about 30 minutes with 3,000 parts by weight of epichlorohydrin, the mixture being kept at a temperature of 60° C. The mixture is then cooled to 25° C and filtered through a layer of kieselguhr (Celite 545, Johns Manville) having a particle size of 20 to 80 $\mu$. The thickness of the layer of kieselguhr is 8 mm, and the rate at which the mixture flows through is about 200 g/minute. The mixture treated in this way is heated in a flask to 80° to 90° C, and 520 parts by weight of saturated aqueous sodium hydroxide solution are then added within about 3 hours. At the same time, an azeotropically boiling mixture of water and epichlorohydrin is continuously distilled out of the reaction mixture. After the completion of the addition of sodium hydroxide solution, the unreacted epichlorohydrin is distilled off under reduced pressure and with a temperature of at most 150° C in the flask. The reaction product obtained is dissolved in 1,200 parts by weight of methyl isobutyl ketone. The sodium chloride formed as a by-product is extracted at 75° to 80° C with 800 parts of water.. The organic phase is then decanted off and evaporated under reduced pressure with a maximum temperature of 170° C in the flask. 650 parts by weight of a liquid epoxy-novolak resin having the following properties are obtained:

| epoxy equivalent weight | 23 |
| viscosity at 25°C | 13,000 cps |
| gelling time at 25°C | 25 minutes |

COMPARISON EXAMPLE A

A flask fitted with a stirrer, a reflux condenser and an inlet tube for an inert gas is charged with 600 parts by weight of a novolak phenolic resin having a softening point of 28° to 32° C and a viscosity of 25 cps in 50 percent ethanol at 25° C. The novolak phenolic resin is prepared in a known manner by condensation of phenol and formaldehyde in a molar ratio of 1.6:1 in the presence of an acid as a catalyst at temperatures of 80° to 100° C. The novolak phenolic resin is mixed with 3,600 parts by weight of epichlorohydrin within 40 minutes, the temperature of the mixture being maintained at about 50° C. After cooling and treatment with kieselguhr in accordance with Example 1, 1,480 parts by weight of saturated aqueous sodium hydroxide solution are added at 80° to 90° C. Water and epichlorohydrin are distilled off in accordance with Example 1. When the addition of the sodium hydroxide solution is complete, the ratio of the number of phenolic hydroxyl groups to the number of moles of sodium hydroxide is 0.9:1. The excess epichlorohydrin is then distilled off under reduced pressure with a maximum temperature of 170° C in the flask. The product obtained is dissolved, purified, and isolated as described in Example 1. 700 parts by weight of a liquid epoxy-novolak resin having the following properties are obtained:

| epoxy equivalent weight | 230 |
| viscosity at 25°C | 40,000 cps |
| gelling time at 25°C | 10 minutes |

EXAMPLE 2

A flask fitted with a stirrer, a reflux condenser, and an inlet tube for an inert gas is charged with 300 parts by weight of the novolak phenolic resin mentioned in comparison Example A. 1,800 parts by weight of eipchlorohydrin are added within 40 minutes at a temperature of 50° C. After cooling and treatment with kieselguhr in accordance with Example 1, the temperature of the mixture is brought to 80° to 90° C. 336 parts by weight of saturated sodium hydroxide solution are then added within about 3 hours, a distillation being carried out in the meantime in accordance with the foregoing examples. In this case the ratio of the number of phenolic hydroxyl groups in the novolak resin to the number of moles of sodium hydroxide is 0.75:1. Excess epichlorohydrin is distilled off. The epoxy-novolak resin is isolated as described in Example 1. 440 parts by weight of liquid epoxy-novolak resin having the following properties are obtained:

| | |
|---|---|
| epoxy equivalent weight | 185 |
| viscosity at 25°C | 15,000 cps |
| gelling time at 25°C | 20 minutes |

COMPARISON EXAMPLE B

A flask fitted with a stirrer, a reflux condenser, and an inlet tube for an inert gas is charged with 215 parts by weight of the novolak phenolic resin described in Comparison Example A. 1,500 parts by weight of epichlorohydrin are added within 30 minutes at a temperature of 50° C. The treatment with kieselguhr is omitted in this case. 260 parts by weight of a 50 percent aqueous sodium hydroxide solution are added to the reactants within 3 hours. The temperature is maintained at 80° to 90° C during this addition, and the distillation is carried out as in the foregoing examples. The ratio of the number of phenolic hydroxyl groups in the novolak resin to the number of moles of sodium hydroxide is 0.7:1. Excess epichlorohydrin is distilled off under reduced pressure with a maximum temperature of 170° C in the flask. The reaction product is dissolved in 600 parts by weight of methyl isobutyl ketone. The sodium chloride formed is extracted with 400 parts by weight of water at a temperature of 75° to 80° C. After decantation, the organic solvent is evaporated off under reduced pressure with a maximum temperature of 170° C in the flask. 190 parts by weight of a liquid epoxy-novolak resin having the following properties are obtained:

| | |
|---|---|
| epoxy equivalent weight | 200 |
| viscosity at 25°C | 50,000 cps |
| gelling time at 25°C | 10 minutes |

We claim:

1. A process for the production of liquid epoxy-novolak resins by reaction of novolak phenolic resins with an epihalohydrin in the presence of an inorganic base, characterized in that a. a novolak phenolic resin having an average molecular weight of about 220 to 300 and with about 2.2 to 2.9 phenolic hydroxyl groups per molecule and an epihalohydrin are mixed and homogenized, about 5 to 10 moles of epihalohydrin being used per mole equivalent of phenolic hydroxyl groups in the novolak phenolic resin, b. the homogenized mixture is brought into contact with kieselguhr at temperatures of about 20° to 40° C, the kieselguhr is then separated, c. an inorganic base selected from the group consisting of alkali metal or alkaline earth metal hydroxides, oxides and carbonates is added to the mixture obtained in accordance with (b) in the course of at least 1 hour at temperatures of about 80° to 115° C, the total quantity of base to be used being so chosen that the ratio of the number of phenolic hydroxyl groups in the novolak resin to the number of equivalents of base is about 0.78:1 to 0.75:1, and d. the liquid epoxy-novolak resin is separated from the mixture obtained in accordance with (c).

2. A liquid epoxy-novolak resin produced in accordance with the process of claim 1.

3. A process in accordance with claim 1, characterized in that, in step (b), 1,000 parts by weight of the mixture comprising the novolak resin and the epihalohydrin are brought into contact with 2–4 parts by wt. of kieselguhr.

4. A liquid epoxy-novolak resin produced in accordance with the process of claim 3.

5. A process in accordance with claim 1, characterized in that, in step (b), the contact time amounts to about 1 to 60 minutes.

6. A liquid epoxy-novolak resin produced in accordance with the process of claim 5.

7. A process in accordance with claim 1, characterized in that about 6 to 8 moles of epichlorohydrin are allowed to react per 1 mole equivalent of hydroxyl groups in the novolak phenolic resin.

8. A liquid epoxy-novolak resin produced in accordance with the process of claim 7.

9. A process in accordance with claim 1, characterized in that sodium hydroxide is used as the inorganic base.

10. A liquid epoxy-novolak resin produced in accordance with the process of claim 9.

11. A process in accordance with claim 9, characterized in that an approximately 45 to 51 wt. percent aqueous solution of sodium hydroxide is used as the inorganic base.

12. A liquid epoxy-novolak resin produced in accordance with the process of claim 11.

13. A process in accordance with claim 1, characterized in that a novolak phenolic resin prepared by condensation of phenol with formaldehyde in a molar ratio of about 1.6:1 to 1.9:1 in the presence of an inorganic or organic acid as a catalyst is used.

14. A liquid epoxy resin produced in accordance with the process of claim 13.

* * * * *